(12) United States Patent
Roberts et al.

(10) Patent No.: US 8,629,569 B2
(45) Date of Patent: Jan. 14, 2014

(54) ELECTROMECHANICAL GENERATOR FOR, AND METHOD OF, CONVERTING MECHANICAL VIBRATIONAL ENERGY INTO ELECTRICAL ENERGY

(75) Inventors: Stephen Roberts, Winchester (GB); Adam Wasenczuk, Eastleigh (GB); Thomas Benoit Julien Mouille, Calne (GB)

(73) Assignee: Perpetuum Ltd., Chilworth Science Park, Southampton, Hampshire (GB)

( * ) Notice: Subject to any disclaimer, the term of this patent is extended or adjusted under 35 U.S.C. 154(b) by 602 days.

(21) Appl. No.: 12/988,219

(22) PCT Filed: Apr. 15, 2009

(86) PCT No.: PCT/GB2009/000973
§ 371 (c)(1),
(2), (4) Date: Feb. 25, 2011

(87) PCT Pub. No.: WO2009/127823
PCT Pub. Date: Oct. 22, 2009

(65) Prior Publication Data
US 2011/0133488 A1 Jun. 9, 2011

(30) Foreign Application Priority Data
Apr. 15, 2008 (GB) .................................. 0806818.1

(51) Int. Cl.
*H02K 35/00* (2006.01)
(52) U.S. Cl.
USPC ........................................... 290/1 R; 310/25

(58) Field of Classification Search
USPC .................................. 290/1 R, 39; 310/25, 29
See application file for complete search history.

(56) References Cited

U.S. PATENT DOCUMENTS

| 3,018,467 | A | 1/1962 | Harris | |
|---|---|---|---|---|
| 7,345,372 | B2 * | 3/2008 | Roberts et al. | 290/1 R |
| 7,453,163 | B2 * | 11/2008 | Roberts et al. | 290/1 R |
| 7,586,220 | B2 * | 9/2009 | Roberts | 310/15 |
| 7,999,402 | B2 * | 8/2011 | Freeland et al. | 290/1 R |
| 8,080,906 | B2 * | 12/2011 | Roberts et al. | 310/29 |

(Continued)

FOREIGN PATENT DOCUMENTS

| DE | 3535143 C1 | 4/1987 |
|---|---|---|
| DE | 19857433 A1 | 6/2000 |

(Continued)

OTHER PUBLICATIONS

Davis, et al.; "An Actively Tuned Solid-State Vibration Absorber Using Capacitive Shunting of Piezoelectric Stiffness"; Journal of Sound and Vibration: 2000; 232(3); 18 pp.

*Primary Examiner* — Nicholas Ponomarenko
(74) *Attorney, Agent, or Firm* — Colin P. Cahoon; Amanda K. Jenkins; Carstens & Cahoon, LLP (57) ABSTRACT

An electromechanical generator for converting mechanical vibrational energy into electrical energy, the electromechanical generator comprising an electrically conductive coil assembly and a magnet assembly, the magnet assembly comprising at least one magnet and a two-part magnetic core, the two parts of the core being mounted by a biasing device so as to be relatively vibratable at a resonant frequency along an axis about a central position thereby to cause a change of magnetic flux linked with the coil assembly to generate an electrical potential in the coil assembly.

20 Claims, 8 Drawing Sheets

(56) References Cited

U.S. PATENT DOCUMENTS

| | | | |
|---|---|---|---|
| 8,492,937 B2 * | 7/2013 | Roberts | 310/25 |
| 2004/0100100 A1 | 5/2004 | Wilson | |
| 2004/0222637 A1 | 11/2004 | Bednyak | |
| 2005/0088059 A1 | 4/2005 | Ohkubo et al. | |
| 2007/0210580 A1 * | 9/2007 | Roberts et al. | 290/1 R |
| 2008/0036307 A1 * | 2/2008 | Lu et al. | 310/15 |
| 2008/0116856 A1 * | 5/2008 | Roberts et al. | 322/3 |
| 2008/0265692 A1 * | 10/2008 | Roberts | 310/15 |
| 2008/0278008 A1 * | 11/2008 | Roberts et al. | 310/29 |
| 2009/0218824 A1 * | 9/2009 | Freeland et al. | 290/1 R |
| 2010/0033142 A1 * | 2/2010 | Roberts et al. | 322/40 |
| 2010/0176664 A1 * | 7/2010 | Roberts et al. | 310/25 |
| 2010/0327672 A1 * | 12/2010 | Roberts | 310/25 |
| 2012/0212097 A1 * | 8/2012 | Wasenczuk et al. | 310/216.001 |

FOREIGN PATENT DOCUMENTS

| | | |
|---|---|---|
| JP | 10341564 A | 12/1998 |
| WO | 2005089283 A2 | 9/2005 |
| WO | 2006109037 A1 | 10/2006 |
| WO | 2007096615 A1 | 8/2007 |

* cited by examiner

ELECTROMECHANICAL GENERATOR FOR, AND METHOD OF, CONVERTING MECHANICAL VIBRATIONAL ENERGY INTO ELECTRICAL ENERGY

The present invention relates to an electromechanical generator for converting mechanical vibrational energy into electrical energy and to a method of converting mechanical vibrational energy into electrical energy. In particular, the present invention relates to such a device which is a miniature generator capable of converting ambient vibration energy into electrical energy for use, for example, in powering intelligent sensor systems. Such a system can be used in inaccessible areas where wires cannot be practically attached to provide power or transmit sensor data.

It is known to use an electromechanical generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa.

For example, a typical known electromechanical generator consists of a magnetic core containing permanent magnet(s) and air gap(s) with wire coil(s) interposed within the gap(s) such that the coil(s) and core(s) may move relative to each other. Such a mechanism used in the majority of known electromagnetic vibration energy harvesters. In this mechanism the flux within the magnetic core(s) remains relatively constant during movement but the flux-linkage-turns of the coil(s) change due to their relative displacement. Such a device is disclosed, for example, in WO-A-2007/096615.

While such known electromechanical generators are useful mechanisms for harvesting energy, when an electromechanical generator is used in a practical application, it is not possible accurately to predict the optimal resonant frequency or the optimal damping factor. The electromechanical generator is designed and set up for what is believed to be the likely operating conditions. However, there is no guarantee that the practical operating conditions correspond to the theoretical ideal used to set up the electromechanical generator for the specific application. In practice, an electromechanical generator is set up to be operable across a narrow range of likely operating conditions, in particular with the damping factor being set up so that the power output is within a range encompassing the optimal power output. However, it is very unlikely that the actual power output is optimised for the specific application. Consequently, the electromechanical generator would not operate at maximum efficiency of the conversion of mechanical vibration energy into electrical energy, and thereby into useful electrical power. In a practical application it is very unlikely that the frequency of vibration will be known before the energy harvester is built. Hence the limited frequency band cannot always be designed to encompass the range of vibration frequencies that might be encountered. This means that the harvester will not always produce useful amounts of power in a typical application.

Also, the frequency of ambient vibration may change during operation. The known electromechanical generator may not be able to operate at maximum efficiency as a result of such a change.

Consequently, known electromagnetically-transduced resonant vibration energy harvesters tend to have a limited frequency band within which they can produce useful electrical power.

One way to overcome this limitation is to provide an adjustable or tuneable frequency band. With a mechanical resonator this can be achieved by changing the spring constant or the mass of the resonator. However mechanisms that adjust these mechanical properties are undesirable because of their inevitable mechanical complexity and resulting cost and reliability issues.

It is known to electrically tune the resonant frequency of electromagnetically-transduced vibration dampers (see the paper entitled "An actively tuned solid-state vibration absorber using capacitive shunting of piezoelectric stiffness", by C. L. Davis et al, Journal of Sound and Vibration (2000) 232(3), 601-617). Such dampers are not energy harvesters, and there is no suggestion how to increase the efficiency of electrical power generation. In these devices no net useful power is extracted from the vibrating system.

In addition, in the paper entitled "Toward self-tuning adaptive vibration based micro-generators", by Shad Roundy et al, 2004, calculations have been made accompanied by the statement that it is not possible to achieve a net increase in the output power of an energy harvester by electrical tuning.

WO-A-2006/109037 discloses an electromechanical device for converting mechanical vibrational energy into electrical energy, the electromechanical device being a velocity damped resonator having a damping coefficient and a resonant frequency. A damping coefficient adjuster is provided for adjusting the damping coefficient of the electromechanical device. A resonant frequency adjuster is also provided. The damping coefficient is changed by altering the load impedance connected to the resonator device. For example the damping coefficient may be adjusted by varying the current permitted to flow through the coil, e.g. by varying the electrical resistance of the circuit containing the coil. The resonant frequency is changed by altering the resonator. The resonant frequency may be adjusted by varying the vibrational characteristics of the spring (for example using a piezoelectric element affixed thereto thereby to vary the spring constant k, by resistive heating or by changing the cross-section of the spring by applying a force). The resonant frequency may alternatively be adjusted by varying the inertial mass, for example by altering the dimensions of the resonator or by changing an applied reactive load. The resonant frequency adjuster may be adapted to vary the spring constant.

This device operates well but there is still a need electrically to tune the electromechanical device to a desired resonant frequency while maintaining optimization of output electrical power.

Accordingly, there is still a need to enhance the efficiency of the conversion of mechanical vibration energy into electrical energy, and thereby into useful electrical power.

The present invention aims to provide an improved electromechanical generator for converting mechanical vibrational energy into electrical energy, and a method of operating such a device, which can achieve a net increase in the output power of an energy harvester by electrical tuning, a result stated by Roundy et al not to be achievable.

The present invention aims to provide an improved electromechanical generator for converting mechanical vibrational energy into electrical energy which can operate more efficiently than known devices in practical use.

The present invention also aims to provide an improved method for operating an electromechanical generator for converting mechanical vibrational energy into electrical energy which can provide more efficient energy conversion than the use of known devices in practical use.

The present invention accordingly provides an electromechanical generator for converting mechanical vibrational energy into electrical energy, the electromechanical generator comprising an electrically conductive coil assembly and a magnet assembly, the magnet assembly comprising at least one magnet and a two-part magnetic core, the two parts of the core being mounted by a biasing device so as to be relatively vibratable at a resonant frequency along an axis about a central position thereby to cause a change of magnetic flux linked with the coil assembly to generate an electrical potential in the coil assembly.

The present invention further provides a method of converting mechanical vibrational energy into electrical energy using an electromechanical generator, the method comprising the steps of: providing an electromechanical generator comprising an electrically conductive coil assembly and a magnet assembly, the magnet assembly comprising at least one magnet and a two-part magnetic core; and vibrating the electromechanical device thereby to move one part of the core relative to the other part of the core at a resonant frequency along an axis thereby to cause a change of magnetic flux in the core and linked with the coil assembly to induce an electrical potential in the coil assembly.

Preferred features are defined in the dependent claims.

The present invention is at least partly predicated on the finding by the present inventor that the frequency of the energy harvester can be tuned electrically via its electromagnetic coupling. This electrical implementation of tuning mechanism is both low-cost and very reliable because there is little or no consequential increase in mechanical complexity of the electromagnetically-transduced resonant vibration energy harvester.

In accordance with an aspect of the present invention, an electromagnetically-transduced resonant vibration energy harvester can be tuned in frequency by connecting either a capacitor and/or inductor across its output.

For the addition of a capacitor, the reduction in natural frequency is given by:

$$\Delta f \approx \frac{C_T \Phi^2}{2m} f_n \quad (1)$$

Where $C_T$ is the capacitor size, $\Phi$ is the linear gradient of flux-linkage-turns found as the resonator moves along its path, m is the mass of the resonator and $f_n$ is the natural frequency of the resonator in the absence of the capacitor.

However, tuning in this way also increases the unwanted damping such that the resonator Q-factor is reduced as more tuning is induced. When this becomes the dominant damping effect then the resulting Q-factor is given by:

$$Q \approx \frac{f_n \Phi^2}{8\pi R_C m \Delta f^2} \quad (2)$$

where $R_C$ is the coil resistance of the device.

There is a need to achieve tuning of the resonant vibration frequency while minimising this deleterious effect of lower Q-factor.

An analysis of equation (2) leads to the conclusion that $\Phi$ should be maximised relative to both $R_C$ and m. However, it not helpful to reduce the mass of the resonator, because higher resonator mass leads to higher power output of the electromagnetic generator in the first place.

The present inventors have determined that, in fact, the following factor should be maximised:

$$\kappa = \frac{\Phi^2}{R_C} \quad (3)$$

The parameter κ represents the strength and efficiency of the electromagnetic coupling within the energy harvester and is a function of the design of the coupling mechanism. The variables are $\Phi$, which is the linear gradient of flux-linkage-turns found as the resonator moves along its path, and $R_C$, which is the coil resistance of the device. By maximising the parameter $\Phi$ in particular, the device can be tuned by a capacitor, and output power can be high.

Embodiments of the present invention will now be described by way of example only with reference to the accompanying drawings, in which.

The electromechanical generator of the present invention is a resonant generator known in the art as "velocity-damped" where all of the work done by the movement of the inertial mass relative to the housing is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described below.

Figure 1:
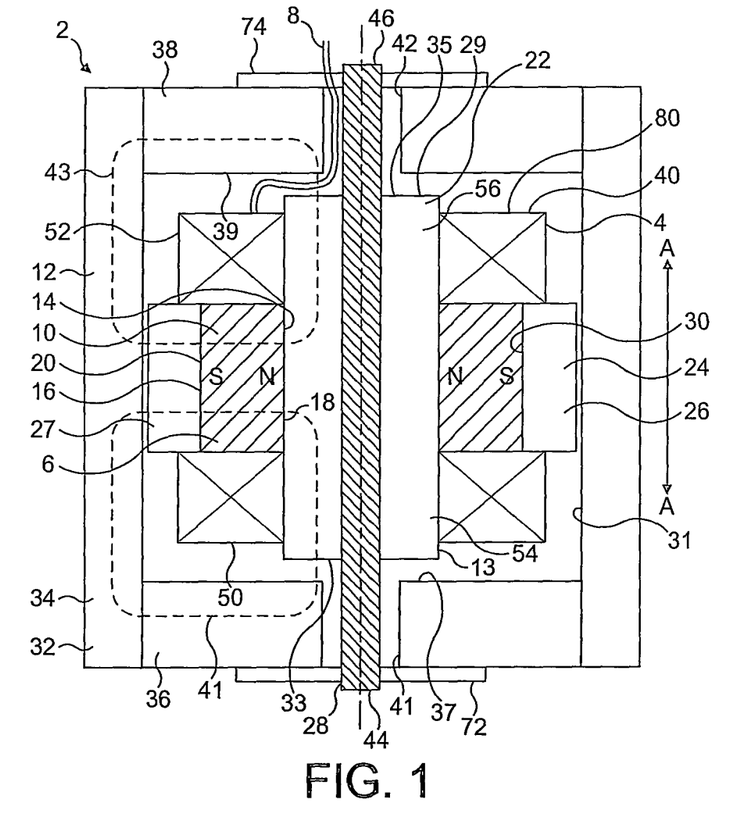
FIG. 1 is a schematic side sectional elevation of an electromechanical device for converting mechanical vibrational energy into electrical energy for use in an electromechanical generator in accordance with a first embodiment of the present invention.

FIG. 1 shows an electromechanical generator 2 for converting mechanical vibrational energy into electrical energy in accordance with an embodiment of the present invention. The electromechanical generator 2 comprises an electrically conductive coil assembly 4 and a magnet assembly 6 that are mounted so as to be relatively movable along an axis A-A by input mechanical vibration having a component in that linear direction. The coil assembly 4 has wires 8 extending therefrom for connecting to external circuitry (not shown). Relative linear vibrational movement between the magnet assembly 6 and the coil assembly 4 along the axis A-A causes an electrical current to be generated in the coil assembly 4 which is outputted via the wires 8.

The magnet assembly 6 comprises at least one magnet 10 and a two-part magnetic core 12. The at least one magnet 10 typically comprises, as shown, an annular magnet 10. The magnet 10 is composed of a magnetic material that exhibits high magnetic hysteresis, and is typically a low-cost permanent ferrite magnet. The present inventors have found that using a high magnetic hysteresis material such as iron or steel as the ferromagnetic material result in excessive energy losses due to large magnetic hysteresis losses incurred as the magnetic flux switches repeatedly during vibration. Hence the core material correspondingly needs to be a magnetically-soft material, such as ferrite material. Ferrite is composed of predominantly metal oxide powder, and is typically pressed into a shape and sintered. MnZn or NiZn ferrites are common types which simply comprise the Mn, Ni and Zn oxides in various proportions. These ferrites are well known for use in high-frequency transformers to prevent excessive hysteresis losses. The ferrite material also has high electrical resistivity, being an oxide and so an electrical insulator, and so reduces any eddy current losses as compared to the use of an electrically conductive core material.

The ferrite core cannot support much magnetic flux, for example much less than iron. Hence only a weak magnet is typically required. The typically employed magnetically-"hard" ferrite magnets are magnetically weak, and very inexpensive to manufacture. However, as an alternative a stronger magnet, but a much smaller one, could be employed.

The annular magnet can be made of linearly-magnetised segments. The annular magnet 10 has opposed poles 14, 16 (i.e. N and S poles) at its annular radially inner and radially outer circumferential surfaces 18, 20 respectively. In this particular embodiment, one pole 14 (i.e. the N pole) contacts and is magnetically coupled to a first body 22 of the core 12 and the other pole 16 (i.e. the S pole) contacts and is magnetically coupled to a second body 24 of the core 12. The core material has a high magnetic permeability, and a low characteristic core loss, such as "ferrite". Together, the first and second bodies 22, 24 form a first part 26 of the two-part magnetic core 12. The first body 22 comprises an axially elongated tube extending along the direction A-A which has an outer cylindrical surface 13 securely fitted to the inner circumferential surface 18 of the magnet 10. The tubular body 22 is securely fitted to a central axially extending support shaft 28. The second body 24 comprises an annulus, having an axis extending along the direction A-A, which has an inner cylindrical surface 30 securely fitted to the outer circumferential surface 20 of the magnet 10.

The second part 32 of the two-part magnetic core 12 in this illustrated embodiment comprises a housing that encloses the magnet 10 and the coil assembly 4. However, in other embodiments other structures may be provided. The housing 32 comprises an annular wall 34 disposed between a bottom wall 36 and a top wall 38, to define a central chamber 40 in which the first part 26 of the magnetic core 12, and the magnet 10, are disposed. The bottom wall 36 and top wall 38 are each provided with a respective central opening 41, 42 therethrough, through which a respective lower end 44 or upper end 46 of the shaft 28 extends in a manner to permit relative axial movement of the housing 32 and the shaft 28, and consequently the first part 26 of the magnetic core 12 and the magnet 10, on the one hand, and the second part 32 of the magnetic core 12, on the other hand.

In the preferred embodiment, the two-part magnetic core 12 and the magnet 10 are each rotationally symmetric about the central axis of rotation aligned with the cylindrical axis of the magnet 10 and the coil assembly 4.

The coil assembly 4 comprises first and second coils 50, 52 electrically connected together. The first and second coils 50, 52 are respectively disposed on opposed sides, in an axial direction, of the magnet 10. Each first and second coil 50, 52 is fitted around a respective end 54, 56 portion of the tubular body 22 of ferromagnetic material. This provides a compact and secure mounting of the coil assembly 4, the first part 26 of the magnetic core 12 and the magnet 10.

In the electromechanical generator of the present invention, the first and second part 26, 32 of the magnetic core 12 are relatively movable. This may be achieved by a variety of constructions. For example, in one construction, the second part 36, i.e. the housing, is fixed and the enclosed first part 26, together with the magnet 10 and the coil assembly 4, are movable along the axis A-A. In another alternative construction, the second part 36, i.e. the housing, is movable along the axis A-A and the enclosed first part 26, together with the magnet 10 and the coil assembly 4, are fixed. In yet another alternative construction, both the second part 36, i.e. the housing, and the enclosed first part 26, together with the magnet 10 and the coil assembly 4, are is movable along the axis A-A.

In each of these constructions, a biasing device urges the movable elements towards a central position and the movable element oscillates about that central position in two opposite directions along the axis A-A against the biasing force.

Although a two-part core 12 is disclosed for the illustrated embodiment, the core 12 may include more than two parts which are relatively movable, and/or each part may include more than one core component.

In the illustrated embodiment, for example, the housing 32 is movable and the shaft 28 is fixed. Therefore the first part 26 of the two-part magnetic core 12, the magnet 10 and the coil assembly 4 are fixedly mounted. A biasing device 70 is mounted between the housing 4 and the shaft 28. The biasing device 70 biases the housing 32 in opposed directions along the axis towards a central longitudinal position as shown in FIG. 1.

The biasing device 70 comprises a pair of plate springs 72, 74. Each plate spring 72, 74 is axially aligned with the axis A-A and biases the movably mounted second part 32 in a respective one of the two opposed directions along the axis towards the central position. The two plate springs 72, 74 each apply the same mechanical biasing force against the second part 32 when the second part 32 is in equilibrium in the central position.

The housing 32 has an interior volume 80 which may include a gas. A hermetic seal (not shown) may surround the housing 32 for hermetically sealing the interior volume 80 of the housing 324.

The electromechanical generator 2 of the illustrated embodiment uses a resonant mass-spring arrangement, being the vibrational magnetic core part 32. If the electromechanical generator 2 is subject to a source of external vibration that causes the electromechanical generator 2 to move along the direction A-A, then the magnetic core part 32 comprises an inertial mass which may move along the direction A-A against the bias of the plate springs 72, 74.

Such relative movement of the magnetic core changes the magnetic flux within the core and hence changes the flux liked with the coil assembly. The change of flux linkage results in an induced electrical potential within the coil which can drive an electrical current through an externally-applied load. In this way electrical power is delivered to the external electrical load.

Although in this embodiment the magnet and coil are fixed and there is a moving core part, in alternative embodiments the opposite configuration may be employed, with the magnet and coil commonly moving relative to a fixed core part.

Also, although in this embodiment the springs are flat plate springs; other biasing elements may be employed.

The first part 26 of the magnetic core 12 sandwiches the magnet 10 between two bodies 22, 24 of magnetic material which thereby presents two magnetically opposed first and second core faces 27, 29 of the first part 26. The first core face 27 is annular and is directed toward the inner cylindrical surface 31 of the second part 32 of the magnetic core 12. The second core face 29 consists of two surfaces 33, 35 which are respectively directed toward the inner surface 37 of the bottom wall 36 and the inner surface 39 of the top wall 38. In this way, the assembly of the two-part ferromagnetic core 12 and the magnet 10 therefore forms two axially spaced magnetic circuits 41, 43, the magnetic flux being shown by the dashed lines in FIG. 1, one for each first and second coil 50, 52. The limits of the lines of magnetic flux each magnetic circuit 41, 43 are defined by the shape of the magnetic core 12, which substantially prevents magnetic flux from the magnet 10 extending axially or radially outwardly from the core 12, and in particular the second part 32 of the core 12 which acts as a housing for the magnet 10 and the coils 50, 52.

The resultant effect is that a single magnet 10 combined with a two-part core 12 provides two separate magnetic circuits 41, 43 in which a very high proportion of the magnetic flux is constrained to pass through the respective coil portion 50, 52. Relative movement of the first and second parts 26, 32 of the core 12 varies the flux within the core 12, and this in turn provides a very high degree of magnetic coupling between the magnet 10 and the coil assembly 4. Consequently, any relative movement between the first and second parts 26, 32 of the core 12, produces a very high rate of change of flux linkage leading to a large value for the parameter κ (which as described above represents the strength and efficiency of the electromagnetic coupling within the energy harvester and is a function of the design of the coupling mechanism). This in turn permits tuning of the resonant frequency so as to match the vibration frequency, which can increase the electrical power output at the coil output.

The electromechanical generator of the present invention differs from the majority of known energy harvester coupling mechanisms because the device is based on a reluctance machine rather than having an air-core (loudspeaker-style) construction. In the known air-core (loudspeaker-style) construction, the magnetic flux within the magnetic core remains relatively constant during the vibrational movement of the coil or magnet. The flux-linkage-turns of the coil(s) change due to the relative displacement of the coil relative to the core. In contrast, the reluctance machine is structured to provide large changes in magnetic flux within the core.

Heretofore, there has been a technical prejudice against using a reluctance machine in an energy harvester. This is because a reluctance machine exhibits a magnetic restoring force that interferes with the springs and resonator, and a reluctance machine generates electrical eddy currents in the core that lower the Q factor of the electromechanical generator.

However, the present inventors have found that an electromechanical generator having the structure of a reluctance machine as described above exhibits up to 100 times higher κ than electromechanical generator based on an air-core machine in the same volume. As stated above, the parameter κ represents the strength and efficiency of the electromagnetic coupling within the energy harvester and is a function of the design of the coupling mechanism. This very high electromagnetic coupling provides an overall technical advantage that significantly outweighs any lower performance resulting from any magnetic restoring force or eddy currents. The structures here disclosed achieve a relatively high ratio of magnetic coupling to restoring force, while the use of ferrite practically removes eddy current losses.

The inventors have found that the parameter κ is increased by providing two magnetic circuits 41, 43 that the flux is sequentially and cyclically diverted between. In contrast, in other devices in which only one magnetic circuit is provided, the parameter κ is relatively low because the provision of only one magnetic circuit would require an attempt to turn the flux on or off (which turning on and off cannot be achieved in practice due to flux leakage).

In use, as described above, as shown in FIG. 2 a capacitance (or an inductance) is disposed across the alternating current (AC) output of the electromechanical generator of the present invention, and selection or variation of the capacitance or inductance can readily be used to tune the resonant frequency of the electromechanical generator. Since the electromagnetic coupling achieved by the reluctance mechanism for the magnetic coupling within an energy harvester of the present invention, it is possible to achieve useful frequency tuning using a capacitor or inductor over a far wider bandwidth than is possible by using an air-core mechanism. This is because the higher κ afforded by the reluctance mechanism reduces the unwanted damping that results from the tuning, as described by expressions (2) and (3) above.

When a capacitance is employed across the output of the electromechanical generator, the value of the capacitance that effects a useful reduction in the resonant frequency is typically on the order of 100's of nanoFarads, for example up to 2500 nanoFarads more typically up to 1000 nanoFarads, the value selected depending, inter alia, upon the mass of the vibratable part and frequency. However the values of inductances that produce useful tuning are typically very large (e.g. on the order of whole Henrys). Hence it is particularly preferred to employ a capacitance as the tuning element.

Most preferably, the tuning capacitance would be provided by an array of selectable capacitors and/or a variable capacitor so that the resonant frequency could be tuned as required.

Correspondingly, the tuning inductance would be provided by an array of selectable inductors and/or a variable inductor so that the resonant frequency could be tuned as required.

As stated above, the Applicant's WO-A-2006/109037 discloses an electromechanical device for converting mechanical vibrational energy into electrical energy, the electromechanical device being a velocity damped resonator and for which resonant frequency can be controllably varied.

Figure 3:
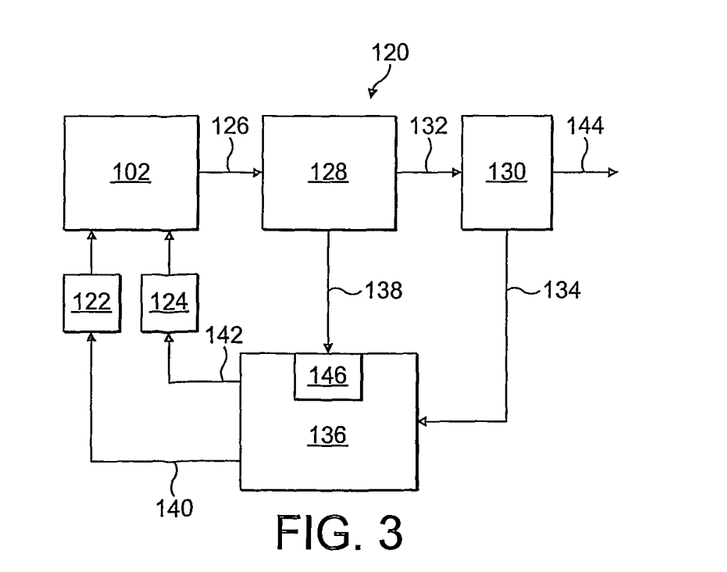
FIG. 3 is a schematic block diagram of an electromechanical generator in accordance with a first embodiment of the present invention, which incorporates the electromechanical device of FIG. 1.

FIG. 3 is a schematic block diagram of an electromechanical generator 120 in accordance with a further embodiment of the present invention.

Figure 2:
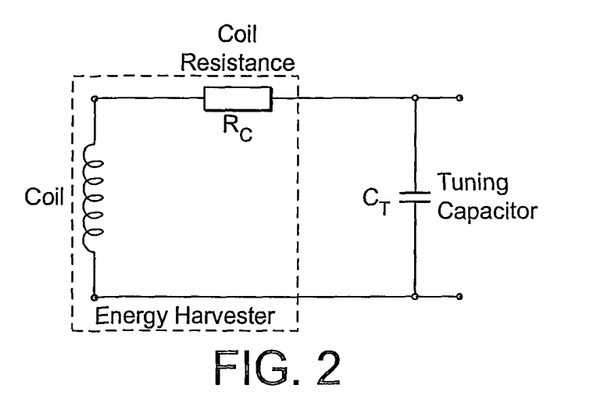
FIG. 2 is a schematic circuit diagram of the electromechanical device of FIG. 1 having a capacitor across its output.

The electromechanical generator 120 comprises the electromechanical device 102 for converting mechanical vibrational energy into electrical energy as described above with reference to FIG. 1. However, a damping coefficient adjuster 122 and a resonant frequency adjuster 124 are additionally provided. The damping coefficient is changed by altering the load impedance connected to the resonator device. For example the damping coefficient may be adjusted by varying the current permitted to flow through the coil, e.g. by varying the electrical resistance of the circuit containing the coil. The resonant frequency is changed by varying the capacitance (or inductance) across the output, as shown in FIG. 2.

The resonant frequency adjuster 124 is adapted to be able to store a preset or default value of a low resonant frequency. The damping coefficient adjuster 122 and the resonant frequency adjuster 124 are adapted to be able to use the preset or default value as a starting value for the respective parameter on initial start up of the electromechanical generator when it is subjected to vibration. These values are selected to ensure that sufficient power is generated on start-up.

The default value of the frequency depends on the particular electromechanical generator and its application. Typically, the default frequency value may be 100 Hz or 120 Hz, for example. This is because many devices vibrate at a frequency near to twice the frequency of mains AC power (50 or 60 Hz).

The electromechanical device 102 has a power output line 126 connected to a power circuit 128. The power output line 126 outputs any electrical current generated by the electromechanical device 102. The power circuit 128 is connected to a power sensor 130 on a power output line 132 (or alternatively has an integral power sensor). The power sensor 130 is connected by a power sensing signal line 134 to a microprocessor controller 136. A power line 138 connects the power circuit 128 to the microprocessor controller 136 to provide sufficient electrical power to drive the microprocessor controller 136. The microprocessor controller 136 has two output control lines, a first control line 140 connected to the damping coefficient adjuster 122 for controlling the damping coefficient and a second control line 142 connected to the resonant frequency adjuster 124 for controlling the resonant frequency by varying the capacitance (or inductance). An output line 144 from the power sensor 130 provides electrical power to drive an external device (not shown). The microprocessor controller 136 includes a comparator 146 to determine whether the output power on power sensing signal line 134 is at a maximum.

Initially, the damping coefficient adjuster 122 is preset to a default value of a high damping coefficient. The default value is preset so as to be sufficient, in conjunction with the remaining parameters of the device, to permit the output power to drive the control circuitry of the electromechanical generator, in particular the microprocessor controller 136, yet insufficient to permit the output power to be optimized or even a useful output power harvested from the mechanical vibration for driving an external device (not shown). Also, initially, the resonant frequency adjuster 124 is preset to a default value corresponding to a low resonant frequency. The default value is preset so that the default frequency is remote from the design resonant frequency of the device, and preferably lower than the design resonant frequency. Again, the default value of the low resonant frequency is selected to permit the output power at that default value to be sufficient to drive the control circuitry of the electromechanical generator, in particular the microprocessor controller 136, yet insufficient to permit the output power to be optimized or even a useful output power harvested from the mechanical vibration for driving an external device (not shown).

Therefore, the damping coefficient is at its highest value and the resonant frequency is at its lowest value either when no control power is applied by the power circuit 128 to drive the microprocessor controller 136 or when the microprocessor controller 136 is first driven into operation by the harvested power on power line 138 for the microprocessor controller 136.

After vibration has commenced, and the electrical current generated by the electromechanical device 102 provides sufficient electrical power to drive the microprocessor controller 136, the microprocessor controller 136 operates to modify the electromechanical device 102 so as to maximize the output power on line 144.

The tuning capacitance (or inductance) of the resonant frequency adjuster 124 is adjusted to modify the frequency. The output power is sensed by the power sensor 130. A comparison is made by comparator 146 to determine whether the output power is at a maximum. If not, a feedback control is performed so that the frequency is progressively adjusted so as to achieve, at a final frequency, maximum output power at the default initial value of the damping coefficient.

Then the damping coefficient adjuster 122 is adjusted. The output power is sensed by the power sensor 130. A comparison is made by comparator 146 to determine whether the output power is at a maximum. If not, a feedback control is performed so that the damping coefficient is progressively adjusted, i.e. reduced, so as to achieve maximum output power at the frequency, of the damping coefficient. Then the damping coefficient and frequency are set, which achieves the peak maximum output power at a frequency f (final) and at a damping coefficient both different from the initial preset values.

Finally, the peak maximum output power is maintained over time during the operational lifetime of the electromechanical generator using a feedback control which periodically determines whether the maximum output power is being generated and adjusts, if necessary one or both of the frequency f and the damping coefficient.

The provision of a capacitance or an inductance across the output of the electromechanical generator provides a reactive tuning element across the output of the electromechanical generator which directly affects the resonant frequency over a broad frequency range If however, the tuning is only partly reactive, for example there is a series or parallel resistance with the capacitor or inductor, the tuning would still work but the damping effect would be increased, which in turn would reduce the ability to control resonant frequency over a broad frequency range. Therefore in accordance with the invention the tuning element is substantially or predominantly reactive.

If the frequency of ambient vibration changes during the operational lifetime of the electromagnetic generator, the response of the device can be changed to accommodate the frequency change, and thereby the electromagnetic generator would be able to operate at maximum efficiency despite the frequency change.

This has particular utility in permitting the capacitance to be varied dependent on temperature changes. Temperature changes affect the resonant frequency of the electromagnetic generator. Instead of providing an electromagnetic generator with expensive temperature-stable spring alloys, the provision of a variable capacitance across the AC output of the coil permits any resonant frequency changes as a result of variation in the spring characteristics due to temperature changes to be accommodated.

Figure 4:
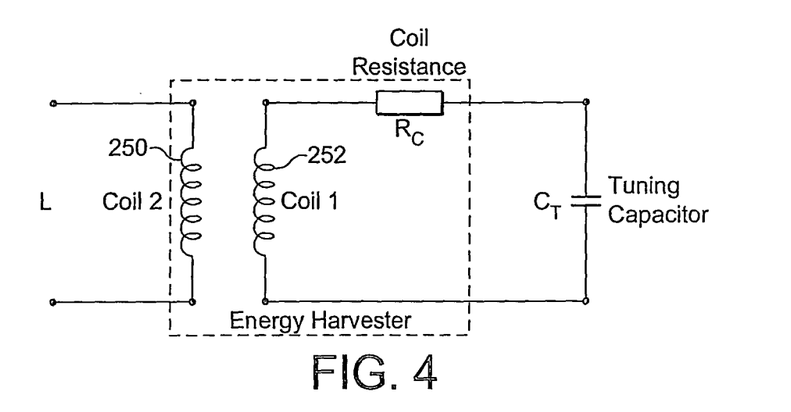
FIG. 4 is a schematic circuit diagram an electromechanical device for converting mechanical vibrational energy into electrical energy for use in an electromechanical generator in accordance with a second embodiment of the present invention.

Referring to FIG. 4, in a second embodiment the electromechanical generator has plural coils that are not electrically connected (unlike the first and second coils 50, 52 in the first embodiment). In this second embodiment, the coils are disposed within the electromagnetic generator in substantially the same structural arrangement as shown in FIG. 1. A first coil 250 is connected to the external load L to provide an output electrical power and a second coil 252 is connected to the variable capacitance $C_T$. The first coil 250 is adapted to provide a low value of parameter κ to optimise the output electrical power and the second coil 252 is adapted to provide a high value parameter κ to optimise the ability to tune the resonant frequency of the electromechanical generator. The properties of each coil 250, 252 are optimised for the production of output electrical power and resonant frequency tuning respectively.

Figure 5:
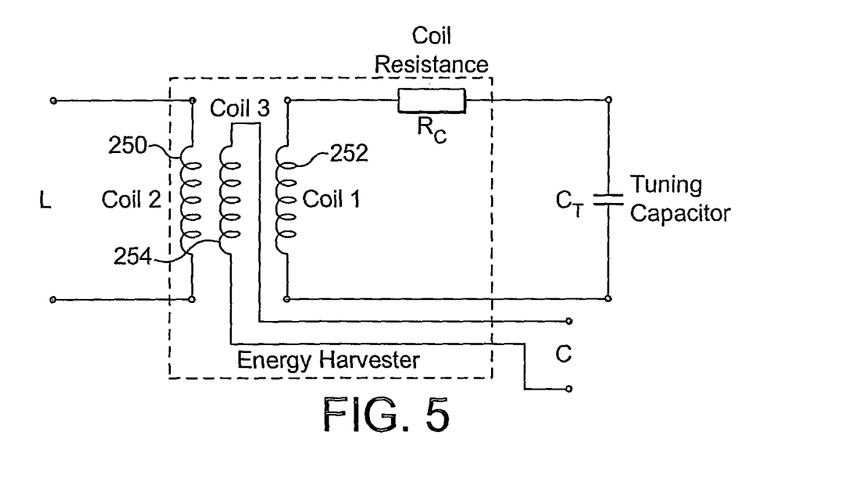
FIG. 5 is a schematic circuit diagram an electromechanical device for converting mechanical vibrational energy into electrical energy for use in an electromechanical generator in accordance with a third embodiment of the present invention.

Referring to FIG. 5, a third embodiment is a modification of the second embodiment of the electromechanical generator and has an additional third coil 254 that is not electrically connected to the first and second coils 250, 252. In this third embodiment, the third coil 254 is also disposed within the electromagnetic generator in substantially the same structural arrangement as shown in FIG. 1. The third coil 254 is connected to the controller C, comprising the capacitor tuning electronics and switches for switching the variable capacitors of the variable capacitance $C_T$. Again, the properties of each coil 250, 252, 254 are optimised for the production of output electrical power, resonant frequency tuning and a tuning control respectively.

Figure 6:
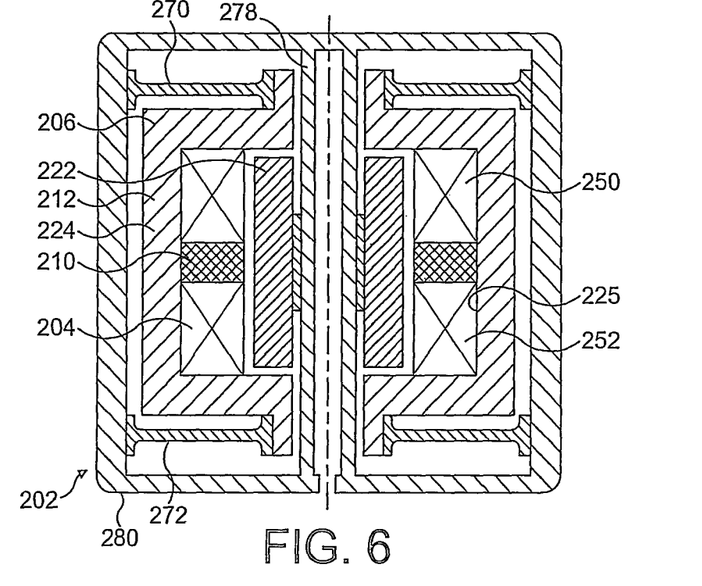
FIG. 6 is a schematic side sectional elevation of an electromechanical device for converting mechanical vibrational energy into electrical energy for use in an electromechanical generator in accordance with a fourth embodiment of the present invention.

Referring to FIG. 6, there is shown an electromechanical device 202 for converting mechanical vibrational energy into electrical energy for use in an electromechanical generator in accordance with a fourth embodiment of the present invention.

The magnet assembly 206 comprises at least one annular magnet 210 and a two-part magnetic core 212. The coil assembly 204 is located above and below the magnet 210. The annular magnet 210 has opposed poles 214, 216 (i.e. N and S poles) at its annular radially inner and radially outer circumferential surfaces, and one pole 214 (i.e. the N pole) is magnetically coupled to, but does not contact, a first fixed body 222 of the core 212 and the other pole 216 (i.e. the S pole) contacts and is magnetically coupled to a second movable body 224 of the core 212. The first and second bodies 222, 224 form the two-part magnetic core 212. The first body 222 is annular and fixed to an axially elongated tube 278, extending along the vibration direction, which is integral with an outer housing 280. The second body 224, which has a C-shaped cross section to define an inner annular cavity 225, contains, fixed within the cavity 225, the magnet 210 and the coil assembly 204. The second body 224 is mounted for vibration relative to the housing 280 by upper and lower annular plate springs 270, 272.

Vibration of the assembly of the second body 224, the magnet 210 and the coil assembly 204 relative to the first body 222 causes an electrical current to be induced in the coil assembly 204.

Figure 7:
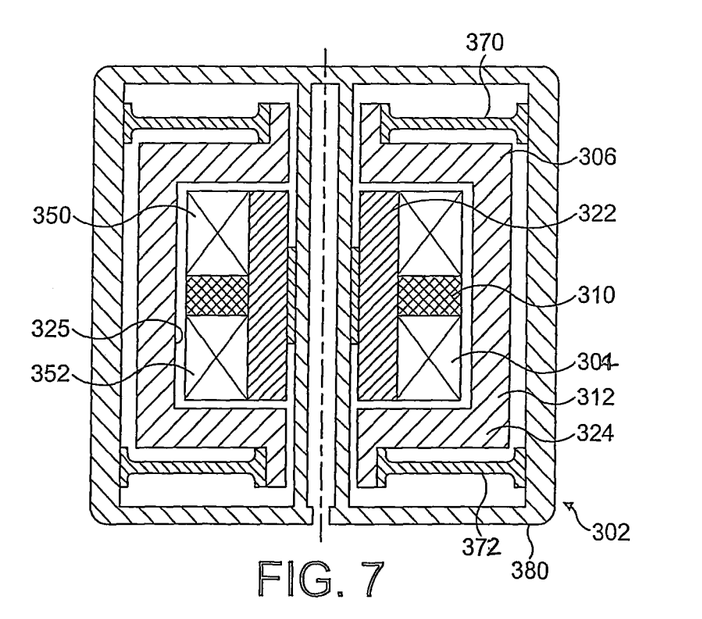
FIG. 7 is a schematic side sectional elevation of an electromechanical device for converting mechanical vibrational energy into electrical energy for use in an electromechanical generator in accordance with a fifth embodiment of the present invention.

Referring to FIG. 7, there is shown an electromechanical device 302 for converting mechanical vibrational energy into electrical energy for use in an electromechanical generator in accordance with a fifth embodiment of the present invention.

The magnet assembly 306 comprises at least one annular magnet 310 and a two-part magnetic core 312. The coil assembly 304 is located above and below the magnet 310. The annular magnet 30 has opposed poles 314, 316 (i.e. N and S poles) at its annular radially inner and radially outer circumferential surfaces, and one pole 314 (i.e. the N pole) contacts and is magnetically coupled to a first fixed body 322 of the core 312 and the other pole 316 (i.e. the S pole) is magnetically coupled to, but does not contact, a second movable body 324 of the core 312. The first and second bodies 322, 324 form the two-part magnetic core 312. The first body 322 is annular and fixed to an axially elongated tube 378, extending along the vibration direction, which is integral with an outer housing 380. The magnet 310 and the coil assembly 304 are affixed to the first body 322. The second body 324, which has a C-shaped cross section to define an inner annular cavity 325, encloses the magnet 310 and the coil assembly 304. The second body 324 is mounted for vibration relative to the housing 380 by upper and lower annular plate springs 370, 372.

Vibration of the second body 324 relative to the assembly of the first body 322, the magnet 310 and the coil assembly 304 causes an electrical current to be induced in the coil assembly 304.

Figure 8:
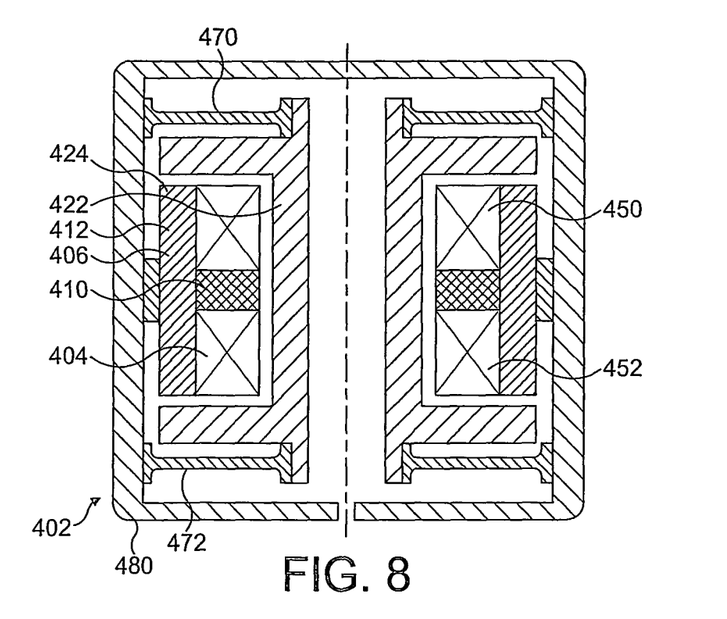
FIG. 8 is a schematic side sectional elevation of an electromechanical device for converting mechanical vibrational energy into electrical energy for use in an electromechanical generator in accordance with a sixth embodiment of the present invention.

Referring to FIG. 8, there is shown an electromechanical device 402 for converting mechanical vibrational energy into electrical energy for use in an electromechanical generator in accordance with a sixth embodiment of the present invention.

The magnet assembly 406 comprises at least one annular magnet 410 and a two-part magnetic core 412. The coil assembly 404 is located above and below the magnet 410. The annular magnet 410 has opposed poles 414, 416 (i.e. N and S poles) at its annular radially inner and radially outer circumferential surfaces, and one pole 414 (i.e. the N pole) is magnetically coupled to, but does not contact, a first movable body 422 of the core 412 and the other pole 416 (i.e. the S pole) contacts and is magnetically coupled to a second fixed body 424 of the core 412. The first and second bodies 422, 424 form the two-part magnetic core 412. The second body 424 is annular and is fixed to an inner annular surface of an outer housing 480. The first body 422, which has a C-shaped cross section to define an outer annular cavity 425, encloses the magnet 410 and the coil assembly 404 which are affixed to the second body 424. The first body 422 is mounted for vibration relative to the housing 480 by upper and lower annular plate springs 470, 472.

Vibration of the first body 422 relative to the assembly of the second body 424, the magnet 410 and the coil assembly 404 causes an electrical current to be induced in the coil assembly 404.

Figure 9:
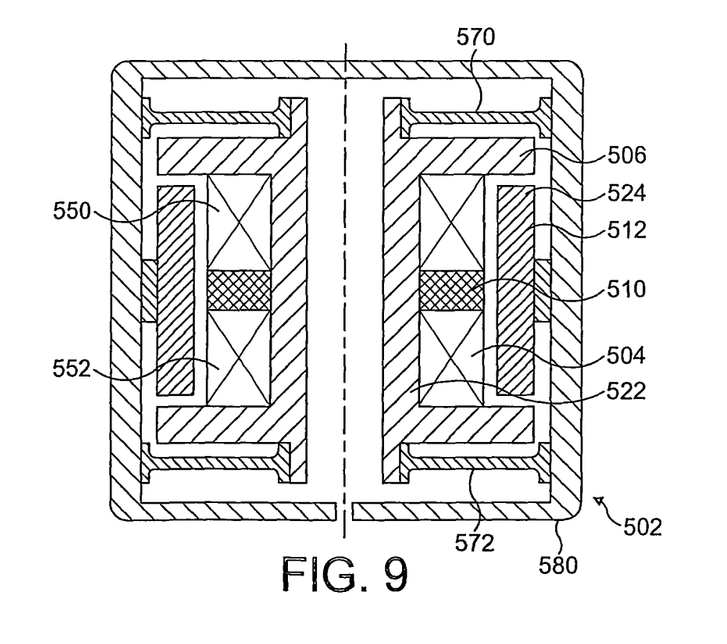
FIG. 9 is a schematic side sectional elevation of an electromechanical device for converting mechanical vibrational energy into electrical energy for use in an electromechanical generator in accordance with a seventh embodiment of the present invention.

Referring to FIG. 9, there is shown an electromechanical device 502 for converting mechanical vibrational energy into electrical energy for use in an electromechanical generator in accordance with a seventh embodiment of the present invention.

The magnet assembly 506 comprises at least one annular magnet 510 and a two-part magnetic core 512. The coil assembly 504 is located above and below the magnet 510. The annular magnet 510 has opposed poles 514, 516 (i.e. N and S poles) at its annular radially inner and radially outer circumferential surfaces, and one pole 514 (i.e. the N pole) contacts and is magnetically coupled to a first movable body 522 of the core 512 and the other pole 516 (i.e. the S pole) is magnetically coupled to, but does not contact, a second fixed body 524 of the core 512. The first and second bodies 522, 524 form the two-part magnetic core 512. The second body 524 is annular and is fixed to an inner annular surface of an outer housing 580. The first body 522, which has a C-shaped cross section to define an outer annular cavity 525, contains, fixed within the cavity 525, the magnet 510 and the coil assembly 504. The first body 522 is mounted for vibration relative to the housing 580 by upper and lower annular plate springs 570, 572.

Vibration of the assembly of the first body 522, the magnet 510 and the coil assembly 504 relative to the second body 524 causes an electrical current to be induced in the coil assembly 504.

Figure 13:
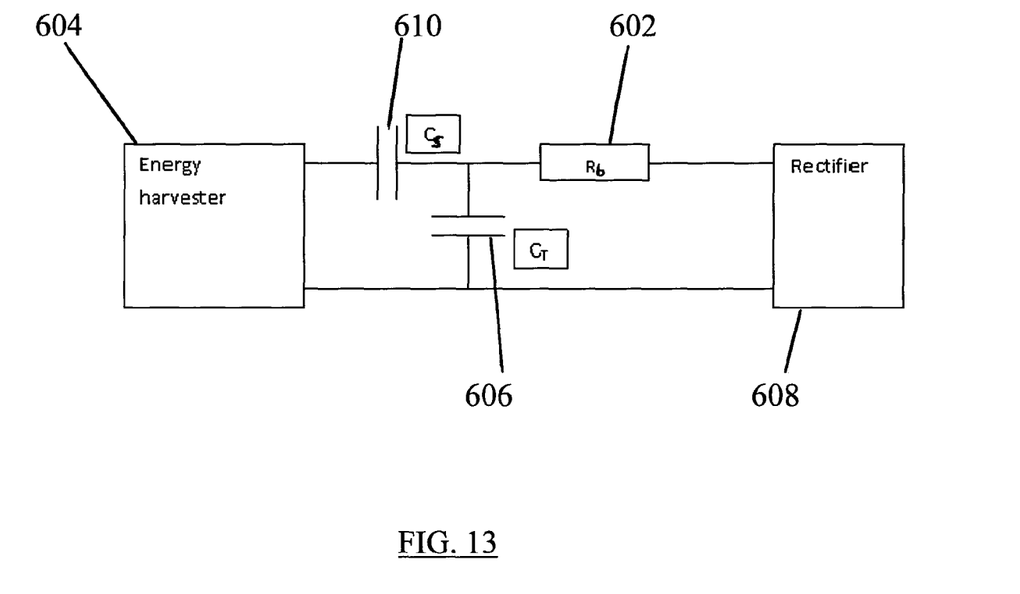
FIG. 13 is a schematic circuit diagram an electromechanical device for converting mechanical vibrational energy into electrical energy for use in an electromechanical generator in accordance with an eighth embodiment of the present invention.

FIG. 13 is a schematic circuit diagram an electromechanical device for converting mechanical vibrational energy into electrical energy for use in an electromechanical generator in accordance with an eighth embodiment of the present invention. In this embodiment, the circuit provides connection to a rectifier.

In the circuit incorporating an electromechanical device for converting mechanical vibrational energy into electrical energy for use in an electromechanical generator in accordance with the various embodiments of the present invention described hereinbefore, in accordance with another preferred aspect of the invention it is possible to provide compensation for coil inductance.

When the energy harvester (i.e. the electromechanical device for converting mechanical vibrational energy into electrical energy) is operating with a tuning reactance, a significant AC current at the vibration frequency flows through the tuning reactance and the coil in series with it. It is for this reason that the coil resistance must be made relatively small, to avoid power losses due to this current flow.

The coil also has a significant inductive reactance, which is lossless but which reduces the efficiency of a tuned energy harvester by affecting the current flow through the tuning reactance. In accordance with this preferred aspect, the efficiency of the tuned energy harvester can therefore be improved by compensating the reactance of the coil inductance L at the generator resonant frequency f with a capacitor $C_s$ of approximately opposite reactance, given by $$C_s \approx \frac{1}{(2\pi f)^2 L}.$$

FIG. 13 shows the incorporation of such a capacitor $C_s$ into the circuit of the embodiment of FIG. 13, although such a capacitor may correspondingly be incorporated into the circuits of the other embodiments. Also, the circuit of the embodiment of FIG. 13 may be modified to provide the capacitor $C_s$ and the series connection to the rectifier independently in accordance with preferred aspects of the present invention.

It is often desirable to connect an energy harvester (i.e. an electromechanical device for converting mechanical vibrational energy into electrical energy) to a rectifier in order to deliver DC output. In the case of a diode or bridge rectifier, current is delivered only when the oscillating output voltage of the energy harvester exceeds the required DC voltage. The energy harvester output current then contains components at frequencies (3 f, 5 f . . . ) greater than the vibration frequency f.

An untuned energy harvester has a high impedance at high frequency, because of the coil inductance. Conversely, an energy harvester tuned by the use of a parallel capacitor $C_T$ as disclosed for example in FIGS. 2, 4 and 5, has a low impedance at high frequency.

It has been observed by the present inventors that when an energy harvester with a parallel tuning capacitor $C_T$ is connected to a rectifier, power delivery becomes inefficient with increasing $C_T$. This is because of the high-frequency impedance behaviour described above.

Referring to FIG. 13, efficiency can be restored by the introduction of a sufficiently large resistance 602, represented by $R_b$ in FIG. 13, or inductance which would be similarly located as the resistance $R_b$ in FIG. 13, in series with the output terminals of the energy harvester 604, after the tuning capacitor 606 represented by $C_T$, which is across the output terminals of the energy harvester 604 and the input terminals of the rectifier 608. The resistance or inductance must be large enough that the total impedance at frequencies 3 f and above is predominantly resistive or inductive.

It has been found by the present inventors that this increase in efficiency more than offsets any power loss in the series resistor.

In the case of a resistor $R_b$, $$R_b \gtrsim \frac{1}{6\pi f C_T}$$

In the case of an inductor $L_b$, $$L_b \gtrsim \frac{1}{(6\pi f)^2 C_T}$$

This correction would typically used in conjunction with the series capacitor $C_s$ described above, which is shown as capacitor 610 in FIG. 13 in series with the output terminals of the energy harvester 604, before the tuning capacitor 606.

Figure 10:
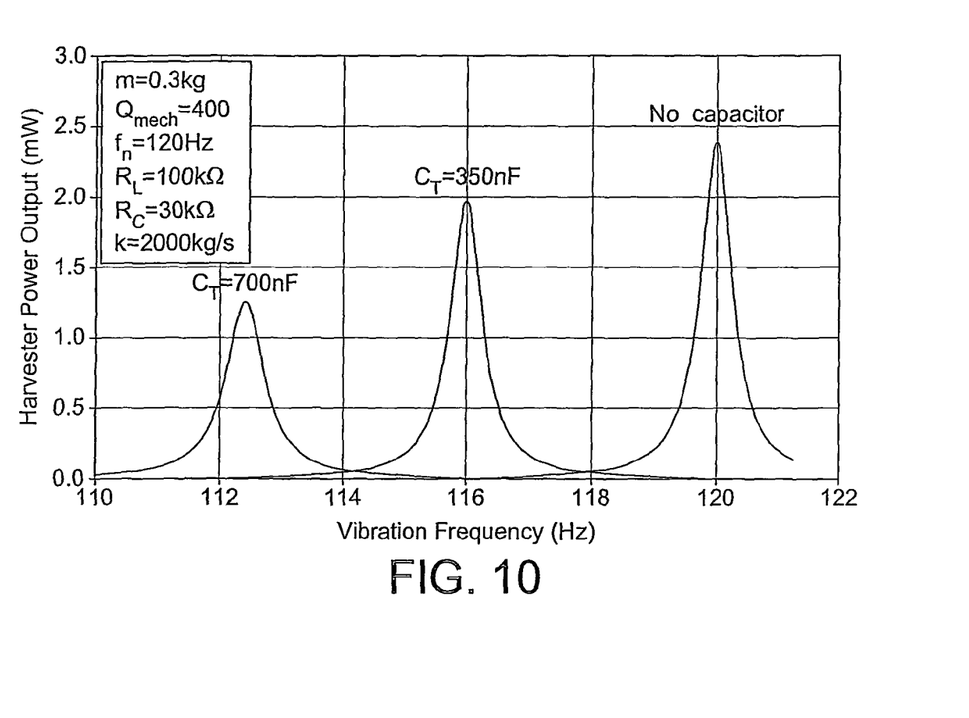
FIG. 10 is a graph showing the relationship between power output and frequency for a series of three capacitances for the electromechanical device of FIG. 1 in the circuit of FIG. 2.
Figure 11:
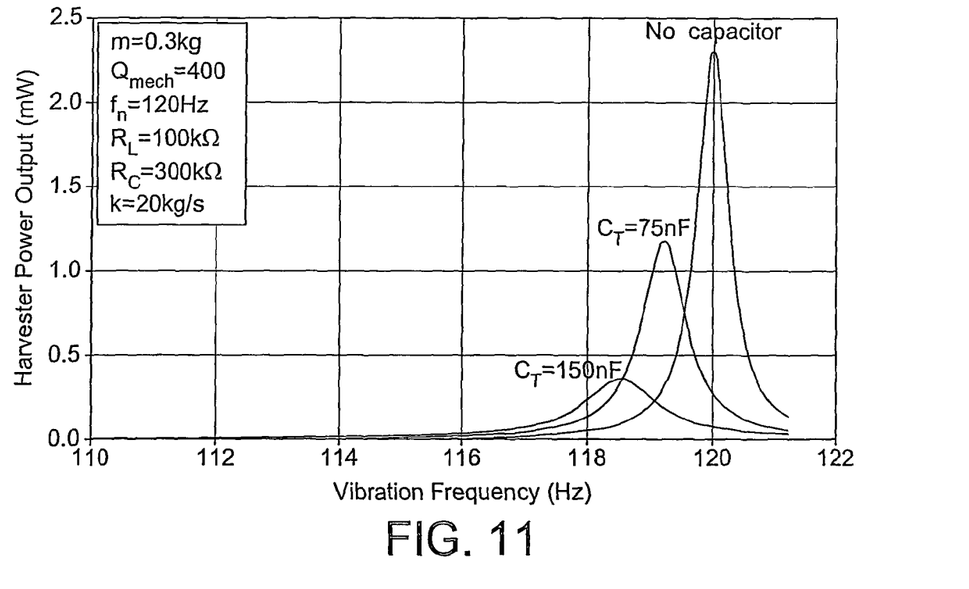
FIG. 11 is a graph showing the relationship between power output and frequency for a series of three capacitances for a comparative electromechanical device, which has a low value of the parameter κ and does not have the structure of the electromechanical device of FIG. 1, in the circuit of FIG. 2.
Figure 12:
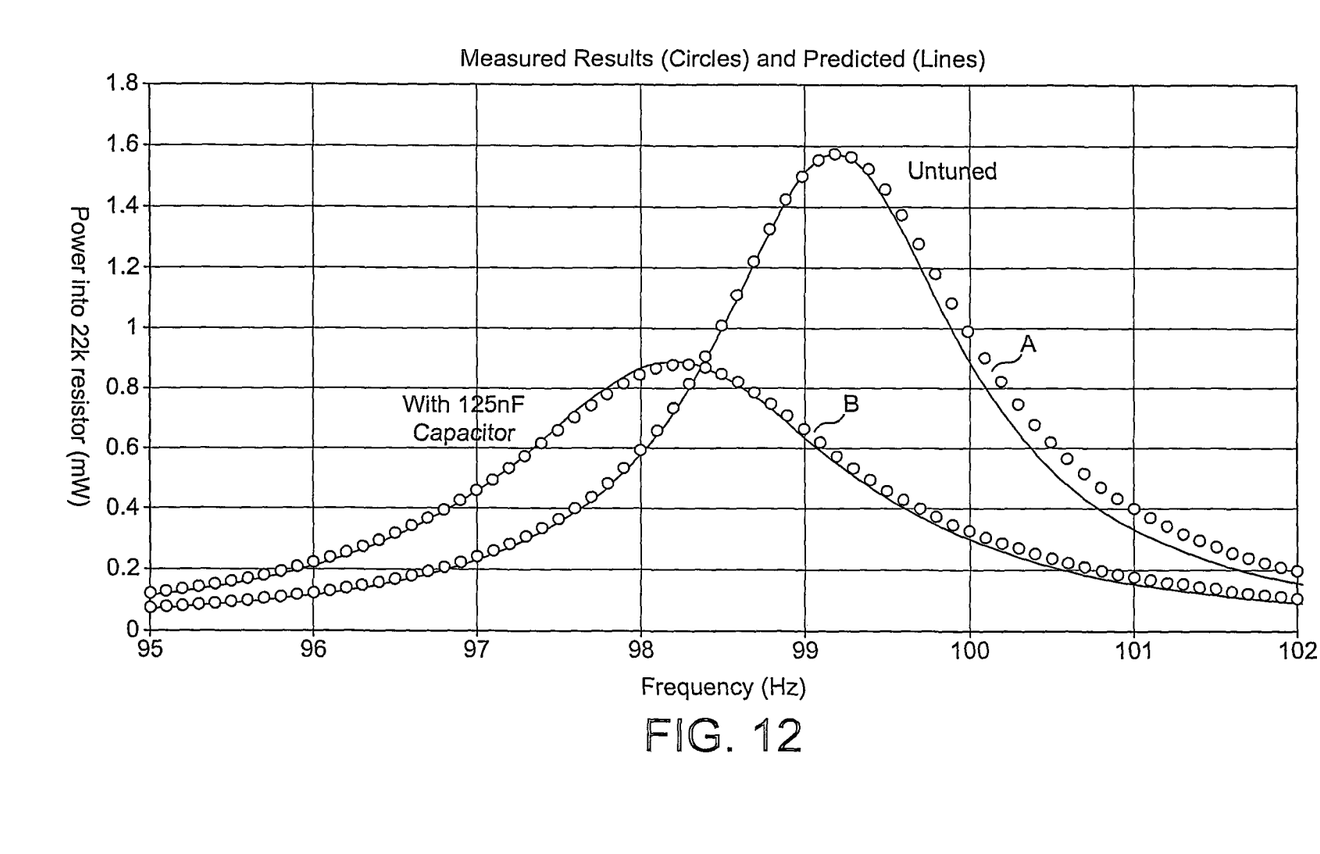
FIG. 12 is a graph showing the relationship, both measured and modeled, between power output and frequency for an electromechanical device when subject to capacitive tuning and when untuned.

The following Examples and Comparative Example of practical use, referring to FIGS. 10 to 12, demonstrates the advantages of the use of tunable damping and frequency in accordance with the embodiments of the present invention.

EXAMPLE 1

An energy harvesting device of the reluctance machine construction and having a high κ in accordance with the present invention was electrically modelled using the equations identified above. The parametric values for the variables m (mass of the resonator), Qmech (the Q factor), $f_n$ (natural frequency of the resonator in the absence of the capacitor), $R_L$ (the resistance of the external load), $R_C$ (coil resistance), and the parameter κ were set as typical values for a practical device. The electromagnetic coupling of the reluctance machine was very high and the parameter κ was 2000 kg/s.

The modelling selected a series of tuning capacitances $C_T$ to be provided across the electrical output of the coil. The output power was calculated for the various capacitances and the results are shown in FIG. 10.

It may be seen from FIG. 10 that in the absense of any capacitance across the electrical output of the coil, the output power of the modelled energy harvester was maximised to a peak at a vibration frequency of about 120 Hz. When the tuning capacitance $C_T$ across the electrical output of the coil was increased to a value of 350 nanoFarads, the output power of the modelled energy harvester was maximised to a peak at a vibration frequency of about 116 Hz. When the tuning capacitance $C_T$ across the electrical output of the coil was increased further to a value of 700 nanoFarads, the output power of the modelled energy harvester was maximised to a peak at a vibration frequency of about 112 Hz.

Although the maximum output power was reduced by providing a tuning capacitance, and progressively reduced as the capacitance increased, from a value of about 2.3 mW to a value of about 2.0 mW at 350 nanoFarads and further to a value of about 1.25 mW at 700 nanoFarads, nevertheless a relatively high useful power output was obtained, tuned to a specific vibration frequency, by providing a selected tuning capacitance.

Accordingly, for an electromechanical generator having a specific mechanical construction that has a specific resonant vibration frequency at which output power is a maximum, and very high electromagnetic coupling provided by a reluctance machine construction, then if that electromechanical generator is required to be employed under conditions in which the input vibrational frequency was different from the specific resonant vibration frequency, the electromechanical generator can be tuned by the addition of a capacitance selected to maximise output power. Even though the tuned device has lower output power, it is still significantly higher than would be available without capacitive tuning, and mechanical modification of the electromechanical generator is avoided.

COMPARATIVE EXAMPLE 1

In contrast, an energy harvesting device having the same parameters, m, Qmech, $f_n$, $R_L$ and $R_C$ but a low κ was electrically modelled using the equations identified above. The electromagnetic coupling of the reluctance machine was low and the parameter κ was 20 kg/s (two orders of magnitude lower than for Example 1).

Again, the modelling selected a series of tuning capacitances $C_T$ to be provided across the electrical output of the coil. The output power was calculated for the various capacitances and the results are shown in FIG. 11.

It may be seen from FIG. 11 that, again, in the absense of any capacitance across the electrical output of the coil, the output power of the modelled energy harvester was maximised to a peak at a vibration frequency of about 120 Hz. When the tuning capacitance $C_T$ across the electrical output of the coil was increased to a value of 75 nanoFarads, the output power of the modelled energy harvester was maximised to a peak at a vibration frequency of about 119 Hz. When the tuning capacitance $C_T$ across the electrical output of the coil was increased further to a value of 150 nanoFarads, the output power of the modelled energy harvester was maximised to a peak at a vibration frequency of about 118.5 Hz.

Therefore in this Comparative Example the addition of a tuning capacitance to a low electromagnetically coupled device does extend the range of vibrational frequency (by about 1.75 Hz to provide any useful output power), but over a much smaller range than for a high electromagnetically coupled device (which was nearly 6 Hz).

Furthermore, in the Comparative Example the maximum output power was reduced by to a much greater degree by providing a tuning capacitance as compared to the Example. In the Comparative Example the maximum output power was progressively reduced as the capacitance increased, from a value of about 2.3 mW to a value of about 1.2 mW at 75 nanoFarads and further to a value of about 0.25 mW at 1500 nanoFarads.

Accordingly, in the Comparative Example the vibrational tuning frequency range to obtain a useful power output was very low, and any levels of output power dropped rapidly at any frequency only slightly away from the natural resonant vibration frequency of the device.

EXAMPLE 2

In this Example, a commercially available energy harvesting device having a maximum output power of about 1.6 mW at a frequency of about 99 Hz was tested to determine the relationship between the output power and vibration frequency. The result is shown in FIG. 12, the measured results being shown by circles of plot A. Additionally, the output was modelled using the same modelling for the previous Example 1 and Comparative Example 1. The modeled output is shown by the line of plot A. A strong correlation between the modelled results and the measured results was obtained.

The same measurements and modelling were used for the same energy harvesting device but with a capacitance of 125 nanoFarads across the electrical output. These results showed a lower maximum output power of about 0.85 mW at a frequency of about 98 Hz. This shows the ability of capacitive tuning to vary the frequency at which useful output power can be obtained.

The invention claimed is:

1. An electromechanical generator for converting mechanical vibrational energy into electrical energy, the electromechanical generator comprising:
    an electrically conductive coil assembly;
    a magnet assembly, the magnet assembly including at least one magnet and a two-part magnetic core; and
    a biasing device that mounts the two parts of the magnetic core so as to be relatively vibratable at a resonant frequency along an axis about a central position thereby to cause a change of magnetic flux linked with the conductive coil assembly to generate an electrical potential in the coil assembly;
    wherein a second part of the magnetic core encloses the electrically conductive coil assembly, the at least one magnet, and a first part of the magnetic core.

2. The electromechanical generator according to claim 1 wherein a first part of the core is fixed and a second part of the core is vibratable about the central position.

3. The electromechanical generator according to claim 1 wherein the electrically conductive coil assembly is mounted to either or both of the first and second parts of the core.

4. The electromechanical generator according to claim 1 wherein the at least one magnet is mounted to either or both of the first and second parts of the core.

5. The electromechanical generator according to claim 1 wherein the electrically conductive coil assembly and the at least one magnet are mounted to the first part of the magnetic core.

6. The electromechanical generator according to any one of claim 1 wherein the at least one magnet comprises an annular magnet having opposed poles at its annular radially inner and radially outer circumferential surfaces respectively, the poles contacting and being magnetically coupled to the first part of the magnetic core.

7. The electromechanical generator according to claim 1 wherein the core comprises a magnetic material that exhibits high magnetic hysteresis, such as a ferrite.

8. The electromechanical generator according to claim 1 wherein the coil assembly comprises first and second coils electrically connected together, the first and second coils being respectively disposed on opposed sides, in an axial direction, of the at least one magnet.

9. The electromechanical generator according to claim 1 further comprising a vibration tuning device across an output of the electrical coil assembly.

10. The electromechanical generator according to claim 9 wherein the vibration tuning device comprises a capacitance, optionally a variable capacitance.

11. The electromechanical generator according to claim 9 wherein the vibration tuning device comprises an inductance, optionally a variable inductance.

12. The electromechanical generator according to claim 9 further comprising a controller for controlling the vibration tuning device in response to the detection of output electrical power or vibration frequency of the electromechanical generator, wherein the controller is adapted to measure the vibration frequency of the core and to select, respectively, a capacitance value or inductance value of the vibration tuning device depending on the measured vibration frequency.

13. The electromechanical generator according to claim 12 further comprising a power circuit, driven by the output electrical power, for driving the controller.

14. The electromechanical generator according to claim 1 further comprising a second electrically conductive coil assembly mounted relative to the magnet assembly whereby relative vibration of the two parts of the core causes a change of magnetic flux linked with the second electrically conductive coil assembly to generate a second electrical potential in the second electrically conductive coil assembly, the second electrically conductive coil assembly being adapted to be connected to a variable capacitance for tuning the resonant frequency of the magnet assembly.

15. The electromechanical generator according to claim 1 further comprising a third electrically conductive coil assembly mounted relative to the magnet assembly whereby relative vibration of the two parts of the core causes a change of magnetic flux linked with the third electrically conductive coil assembly to generate a third electrical potential in the third electrically conductive coil assembly, the third electrically conductive coil assembly being adapted to be connected to controller for controlling a vibration tuning device in response to the detection of output electrical power or vibration frequency of the electromechanical generator.

16. The electromechanical generator according to claim 9 further comprising a capacitor device connected in series to an output of the electrically conductive coil assembly, the capacitor device having a capacitance $C_s$, wherein $$C_s \approx \frac{1}{(2\pi f)^2 L}$$

and wherein L is the inductance of the electrically conductive coil assembly and f is the resonant frequency of the magnetic core of the magnet assembly.

17. The electromechanical generator according to claim 9 further comprising a resistor device in series with the output of the electrical coil assembly and on an output side of the vibration tuning device which is a capacitor having a capacitance $C_T$, the resistor device having a resistance $R_b$, wherein $$R_b \gtrsim \frac{1}{6\pi f C_T}$$

and wherein f is the resonant frequency of the magnetic core of the magnet assembly.

18. The electromechanical generator according to claim 9 further comprising an inductor resistor device in series with the output of the electrical coil assembly and on an output side of the vibration tuning device which is a capacitor having a capacitance $C_T$, the inductor device having an inductance $L_b$, wherein $$L_b \gtrsim \frac{1}{(6\pi f)^2 C_T}$$

and wherein f is the resonant frequency of the magnetic core of the magnet assembly.

19. A method of converting mechanical vibrational energy into electrical energy using an electromechanical generator, the method comprising the steps of:
   providing an electromechanical generator comprising an electrically conductive coil assembly and a magnet assembly, the magnet assembly comprising at least one magnet and a two-part magnetic core, wherein a second part of the magnetic core encloses the electrically conductive coil assembly, the at least one magnet, and a first part of the magnetic core; and
   vibrating the electromechanical device thereby to move one part of the core relative to the other part of the core at a resonant frequency along an axis thereby to cause a change of magnetic flux in the core and linked with the coil assembly to induce an electrical potential in the coil assembly.

20. The method according to claim 19 further comprising providing a vibration tuning device across an output of the electrical coil assembly, optionally wherein the vibration tuning device comprises a variable capacitance or variable inductance, and further comprising the step of setting the variable capacitance or variable inductance, respectively, to maximize the output electrical power.

* * * * *